(12) United States Patent
Toyama (10) Patent No.: US 9,197,042 B2
(45) Date of Patent: Nov. 24, 2015

(54) WIRE HARNESS AND METHOD OF MANUFACTURING WIRE HARNESS

(75) Inventor: Eiichi Toyama, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 163 days.

(21) Appl. No.: 13/976,656

(22) PCT Filed: Dec. 28, 2011

(86) PCT No.: PCT/JP2011/080598
§ 371 (c)(1),
(2), (4) Date: Jun. 27, 2013

(87) PCT Pub. No.: WO2012/091174
PCT Pub. Date: Jul. 5, 2012

(65) Prior Publication Data
US 2013/0306371 A1    Nov. 21, 2013

(30) Foreign Application Priority Data
Dec. 28, 2010   (JP) ................ 2010-292021

(51) Int. Cl.
H02G 3/04       (2006.01)
B60R 16/02      (2006.01)
H02G 3/06       (2006.01)

(52) U.S. Cl.
CPC .......... *H02G 3/0406* (2013.01); *B60R 16/0207* (2013.01); *B60R 16/0215* (2013.01); *H02G 3/0641* (2013.01)

(58) Field of Classification Search
USPC ........ 174/72 A, 72 R, 68.1, 68.3, 21 R, 22 C, 174/93; 439/207
See application file for complete search history.

(56) References Cited

U.S. PATENT DOCUMENTS

| 7,172,042 | B2 | 2/2007 | Yamaguchi et al. |
| 7,216,676 | B2 | 5/2007 | Barnhouse et al. |
| 7,743,792 | B2 | 6/2010 | Burke et al. |
| 2005/0011687 | A1 | 1/2005 | Yamaguchi et al. |
| 2005/0124999 | A1 | 6/2005 | Teitelbaum et al. |
| 2005/0170120 | A1 | 8/2005 | Teitelbaum et al. |
| 2005/0241714 | A1 | 11/2005 | Barnhouse et al. |
| 2006/0232065 | A1* | 10/2006 | Burke et al. ............ 285/259 |

(Continued)

FOREIGN PATENT DOCUMENTS

| EP | 1 440 834 A1 | 7/2004 |
| JP | 4-210182 A | 7/1992 |

(Continued)

OTHER PUBLICATIONS

Search Report dated May 22, 2012 issued in International Application No. PCT/JP2011/080598 (PCT/ISA/210).

(Continued)

*Primary Examiner* — Dhirubhai R Patel
(74) *Attorney, Agent, or Firm* — Sughrue Mion, PLLC (57) ABSTRACT

A wire harness includes: one or more conductive paths; and an outer member that includes a plurality of leading outer members, each having a tubular shape that passes along the one or more conductive paths; and a watercrosslinkable fixing member or a photocrosslinkable fixing member that bonds adjacent leading outer members of the plurality of leading outer members which are separate away from each other in a longitudinal direction of the one or more conductive paths.

5 Claims, 3 Drawing Sheets

(56) References Cited

U.S. PATENT DOCUMENTS

2007/0017591 A1    1/2007    Barnhouse et al.
2010/0043225 A1*   2/2010    Oga et al. .................. 29/857

FOREIGN PATENT DOCUMENTS

| | | |
|---|---|---|
| JP | 8-249933 A | 9/1996 |
| JP | 2002-281646 A | 9/2002 |
| JP | 2004-224156 A | 8/2004 |
| JP | 2008-226587 A | 9/2008 |
| JP | 2010-45900 A | 2/2010 |
| WO | 2005/042858 A2 | 5/2005 |
| WO | 2005/106305 A1 | 11/2005 |

OTHER PUBLICATIONS

Written Opinion dated May 22, 2012 issued in International Application No. PCT/JP2011/080598 (PCT/ISA/237).

Office Action dated Aug. 5, 2014 issued by the Japanese Patent Office in counterpart Japanese Patent Application No. 2010-292021.

Office Action, Issued by the State Intellectual Property Office of P. R. China, Dated Dec. 31, 2014, In counterpart Chinese Application No. 201180063624.2.

* cited by examiner

WIRE HARNESS AND METHOD OF MANUFACTURING WIRE HARNESS

TECHNICAL FIELD

The present invention relates to a wire harness including one or more conductive paths and an outer member that covers the conductive paths, and to a method of manufacturing the wire harness.

BACKGROUND ART

A wire harness disclosed in Patent Literature 1 includes three high voltage cables and three metal protection pipes that receive and protect the three respective high voltage cables. The high voltage cable is provided to connect a motor that is mounted at a front part of a vehicle to an inverter that is mounted at an intermediate part or a rear part of the vehicle.

The wire harness is arranged through a floor body of the vehicle that is outside of a vehicle frame. Thus, the metal protection pipe is formed to protect the high voltage cable from stone bounce or water splash. The metal protection pipe has a stiffness to protect the high voltage cable from stone bounce or water splash and to prevent the high voltage cable from bending. The metal protection pipe also has an electromagnetic shield function since it is made of metal.

The wire harness is manufactured by inserting the three high voltage cables into the respective metal protection pipes in a straight state, and then bending the metal protection pipes along an arrangement route of the wire harness at the floor body of the vehicle. The wire harness is manufactured as described above in a factory of a harness manufacturer, transported to an assembly factory of a vehicle manufacturer and assembled in a predetermined position of the vehicle. Accordingly, the wire arrangement is completed.

CITATION LIST

Patent Literature

Patent Literature 1: JP-A-2004-224156

SUMMARY OF INVENTION

Technical Problem

In the above described related art, there is a problem in that when the wire harness is transported, in order to prevent the metal protection pipes from coming into contact with each other or deforming, sufficient space is required to secure for each metal protection pipe and each wire harness. In addition, there is a problem in that since the metal protection pipe is bent in three dimensions, it is necessary to secure three dimensional spaces.

To solve the above described problems, a bendable tube may be used as a substitute member of the metal protection pipe. However, only what the bendable tube is used as the substitute member of the metal protection pipe makes it difficult to solve various problems as described below.

In other words, using the tube that has only a bendable property remains a problem in that when the wire harness is assembled and arranged or after the wire harness is arranged, it is difficult to maintain the wire harness in a desired shape. In addition, if the desired shape is difficult to be maintained, it is necessary to add, for example, a protector when the tube is assembled at a predetermined position of a vehicle. Since the protector is a member that is formed by resin molding in line with the arrangement route, the protector must be a dedicated member in a dedicated design for each of vehicles, and also the versatility is decreased and the cost is increased.

Since a trial mold is made for the protector many times in the development stage, a design cost, a molding cost, a design time or the like may be high/increased. In addition, since a portion of the protector that is assembled into the tube becomes large sized, the protector may be close to the ground.

In addition, there is a problem in that since the metal protection pipe may be crushed when a bending process is performed on the metal protection pipe by a bending machine or the like, and if it is crushed, the high voltage cable inside thereof is damaged by stress.

The present invention has been made considering the above described situation, and an object thereof is to provide a wire harness and a method of manufacturing the wire harness that is bendable and holdable in a desired shape, without a complicated structure like a protector, thereby suppressing the costs.

Solution to Problem

In order to solve the above described problem, a wire harness according to a first aspect of the invention includes one or more conductive paths; and an outer member that includes a plurality of leading outer members, each having a tubular shape that passes along the one or more conductive paths; and a watercrosslinkable fixing member or a photocrosslinkable fixing member that bonds adjacent leading outer members of the plurality of leading outer members which are separate away from each other in a longitudinal direction of the one or more conductive paths.

According to the first aspect of the invention, the wire harness includes one or more conductive paths and the outer member. The outer member includes a plurality of the leading outer members, each having the tubular shape, and the leading outer member passes along the one or more conductive paths. Before the watercrosslinkable fixing member or the photocrosslinkable fixing member is successively provided, the adjacent leading outer members permit bending of the conductive paths between them. The watercrosslinkable fixing member or the photocrosslinkable fixing member is a member that is hardened or cross-linked by fluid or light, and when the member is hardened, the adjacent leading outer members are bonded. In other words, the outer member becomes a successive tube. The wire harness is held in a desired shape from the bendable state.

In the wire harness according to a second aspect of the invention, the watercrosslinkable fixing member or the photocrosslinkable fixing member may be formed as a bending portion of the outer member.

According to the second aspect of the invention, the watercrosslinkable fixing member or the photocrosslinkable fixing member that bonds the adjacent leading outer members becomes the bending portion of the outer member. Thus, the wire harness is in a state in which it is held in a desired shape including the bent shape. In addition, when the watercrosslinkable fixing member or the photocrosslinkable fixing member becomes the bending portion of the outer member, the bending process using a bending machine, for example, is not required. As a result, the stress of the conductive path is not applied by the bending process. In addition, if the bending machine is not required, large equipment is not present and restrictions relating to the manufacture of the wire harness are relieved. In other words, the wire harness may be manufactured in any place.

In the wire harness according to a third aspect of the invention, the watercrosslinkable fixing member or the photocrosslinkable fixing member may be directly contacted with the one or more conductive paths.

Further, in the wire harness according to a fourth aspect of the invention, the wire harness may include an electromagnetic shield member that covers almost entire length of the one or more conductive paths, and the watercrosslinkable fixing member or the photocrosslinkable fixing member may be contacted with the electromagnetic shield member.

According to the third or fourth aspect of the invention, when the watercrosslinkable fixing member or the photocrosslinkable fixing member is hardened, the adjacent leading outer members are bonded and the watercrosslinkable fixing member or the photocrosslinkable fixing member is closely contact to the conductive path. The conductive path is in a holding state by hardening of the watercrosslinkable fixing member or the photocrosslinkable fixing member.

In addition, in order to solve the above described problem, a method of manufacturing a wire harness according to a fifth aspect of the invention includes a first process of passing a plurality of leading outer members, each having a tubular shape along one or more conductive paths; and a second process of bonding adjacent leading outer members of the plurality of leading outer members which are separate away from each other in a longitudinal direction of the one or more conductive paths by a watercrosslinkable fixing member or a photocrosslinkable fixing member.

According to the fifth aspect of the invention, the first process and the second process are performed in manufacturing of the wire harness including one or more conductive paths and the outer member.

In the method of manufacturing the wire harness according to a sixth aspect of the invention, the second process may be performed during the arrangement operation of the wire harness after the wire harness is transported.

According to the sixth aspect of the invention, the wire harness is manufactured considering a desired shape when the wire harness is transported to an assembly factory of a vehicle manufacturer, for example, and a desired shape when the wire harness is assembled at a predetermined position of the vehicle.

Advantageous Effects of Invention

According to the first aspect, the outer member includes the leading outer members having the tubular shape and the watercrosslinkable fixing member or the photocrosslinkable fixing member that is hardened by fluid or light, so that the conductive path can be bent between the adjacent leading outer members before the watercrosslinkable fixing member or the photocrosslinkable fixing member is provided, and the wire harness can be held in a desired shape after the watercrosslinkable fixing member or the photocrosslinkable fixing member is provided and hardened. In addition, according to the first aspect of the invention, since the leading outer member and the watercrosslinkable fixing member or the photocrosslinkable fixing member are used, the conductive path is protected where the structure thereof is not as complicated as a protector, and the cost may be suppressed. Further, according to the first aspect of the invention, since the leading outer member and the watercrosslinkable fixing member or the photocrosslinkable fixing member are used, the wire harness having high versatility compared to the use of the protector can be provided.

According to the second aspect, the wire harness can be held in a desired shape including the bent shape. In addition, according to the second aspect, the wire harness having high versatility can be provided by forming the watercrosslinkable fixing member or the photocrosslinkable fixing member to the bending portion of the outer member.

According to the third or fourth aspect, there is an advantage that a further favorable embodiment of the wire harness can be provided.

According to the fifth aspect, there is an advantage that the method of manufacturing the wire harness can be provided further favorably.

According to the sixth aspect, there is an advantage that the manufacturing method can be provided considering the transportation and assembly of the wire harness.

DESCRIPTION OF EMBODIMENTS

A wire harness includes one or more conductive paths and includes a plurality of leading outer members having a tubular shape as an outer member of the conductive path; and adjacent leading outer members are bonded by a watercrosslinkable fixing member or a photocrosslinkable fixing member for later attachment. The wire harness is configured such that the conductive path(s) may be bent between the adjacent leading outer members before the watercrosslinkable fixing member or the photocrosslinkable fixing member are provided. The wire harness is held in a desired shape from the bendable state when the watercrosslinkable fixing member or the photocrosslinkable fixing member are hardened or cross-linked and the adjacent leading outer members are bonded.

Embodiment

Figure 1A:
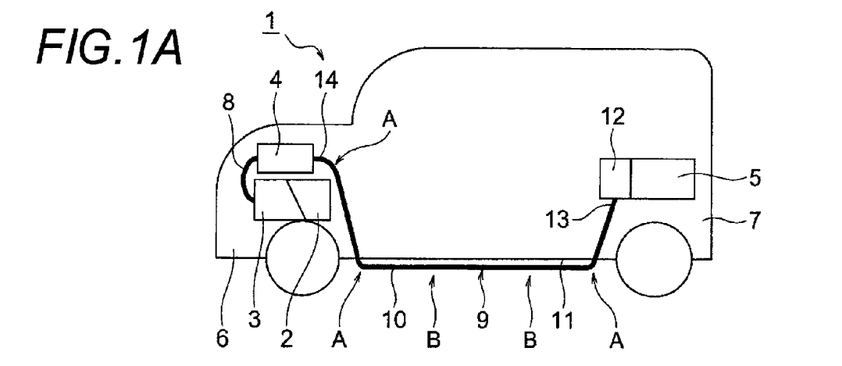
FIG. 1A is a schematic view illustrating an arrangement of a wire harness according to an embodiment of the invention.
Figure 1B:
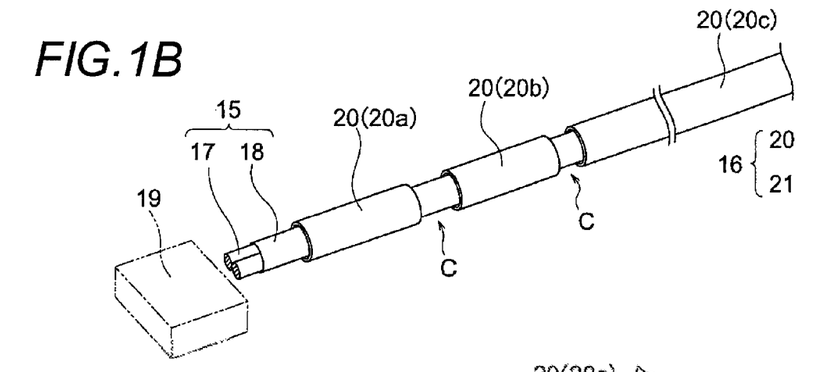
FIG. 1B is a perspective view illustrating a state of firstly passing a leading outer member having a tubular shape along a conductive path.
Figure 1C:
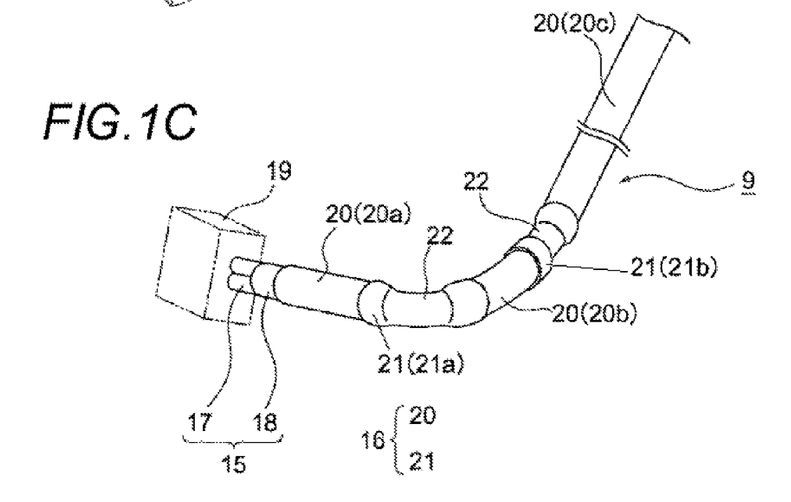
FIG. 1C is a perspective view illustrating a state of bonding the adjacent leading outer members by a photocrosslinkable fixing member (or by a watercrosslinkable fixing member) for later attachment.
Figure 2A:
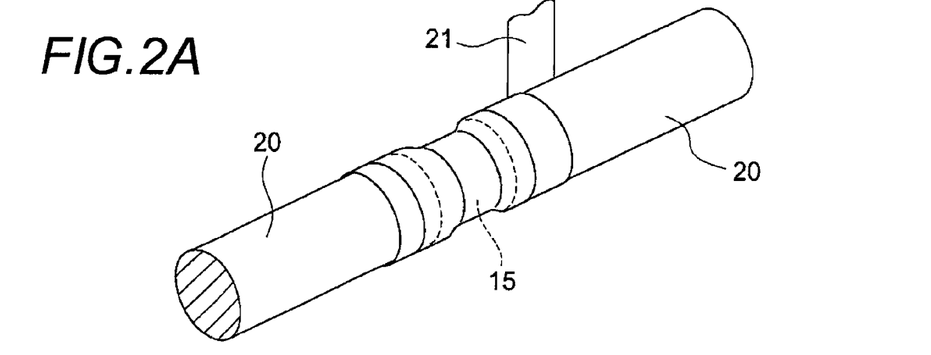
FIG. 2A is a perspective view illustrating a state of repetitively winding and bonding the narrow photocrosslinkable fixing member (or the narrow watercrosslinkable fixing member).
Figure 2B:
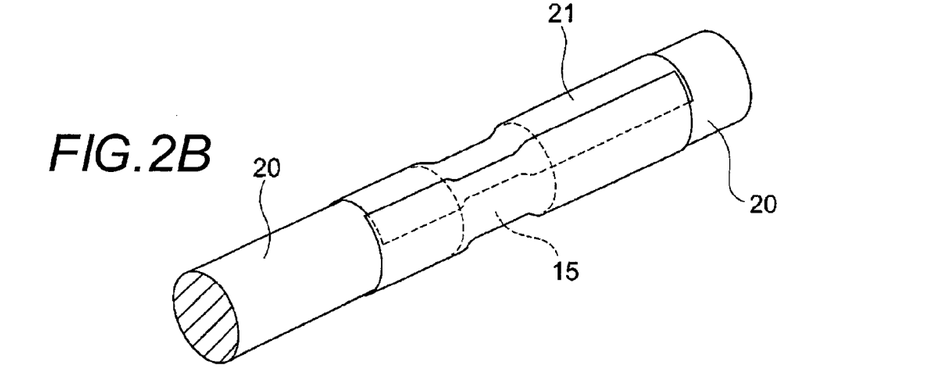
FIG. 2B is a perspective view illustrating a state of rolling and bonding the wide photocrosslinkable fixing member (or the wide watercrosslinkable fixing member).
Figure 2C:
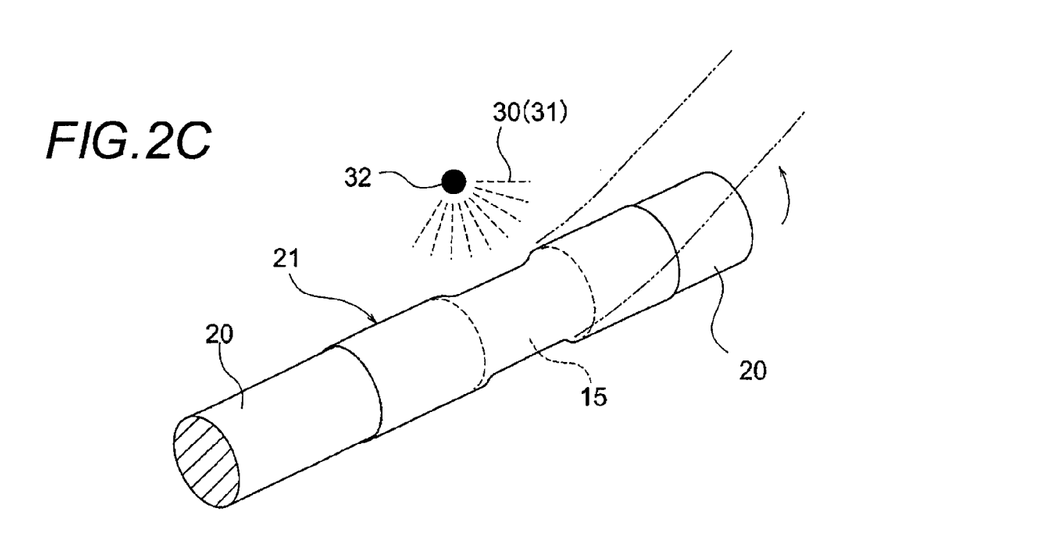
FIG. 2C is a perspective view illustrating a state when the photocrosslinkable fixing member (or the watercrosslinkable fixing member) is hardened or cross-linked.
Figure 3A:
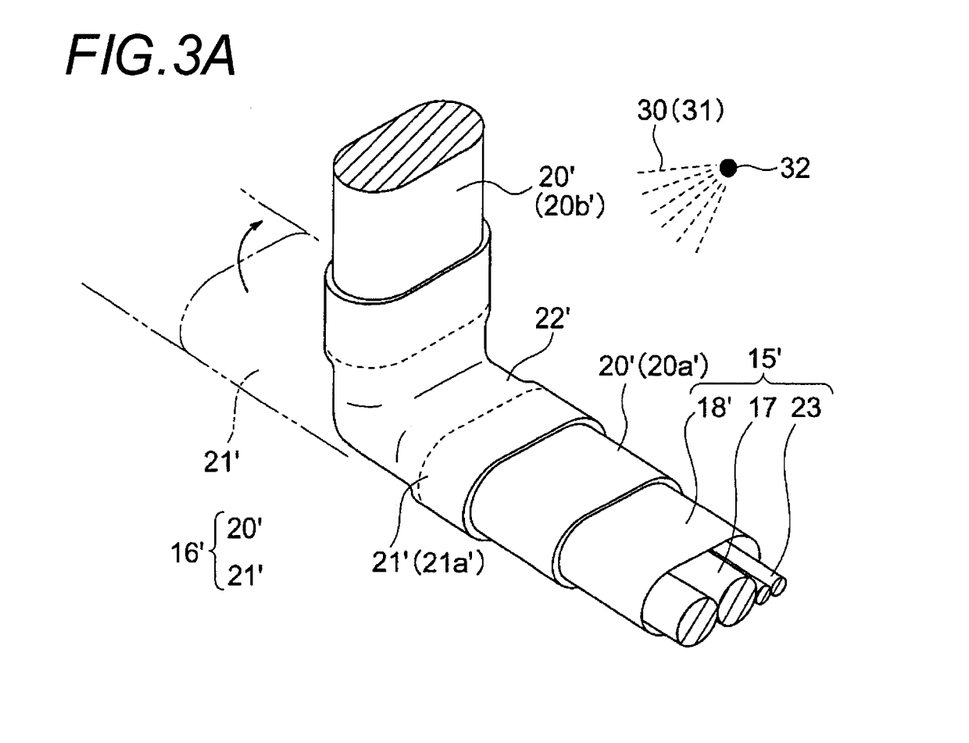
FIG. 3A is a perspective view illustrating a case where another example of a leading outer member and a photocrosslinkable fixing member (or a watercrosslinkable fixing member) having horizontally-long shape in cross-section is used.
Figure 3B:
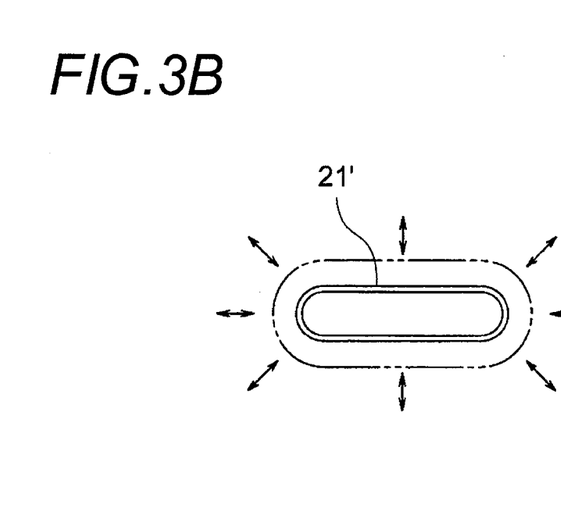
FIG. 3B illustrates a case where a photocrosslinkable fixing member (or a watercrosslinkable fixing member) having a cylinder shape and a property of flexibility is used.

Hereinafter, an embodiment will be described with reference to the drawings. FIGS. 1A to 1C are diagrams of the wire harness according to the embodiment. FIGS. 2A to 2C are diagrams showing the photocrosslinkable fixing member. FIGS. 3A and 3B are diagrams according to another example of a leading outer member and a photocrosslinkable fixing member. In the embodiment, description will be given according to an example of the wire harness of the invention that is employed in a hybrid motor vehicle (may be also in an electric vehicle).

In FIG. 1A, a hybrid motor vehicle 1 is a vehicle where the power of an engine 2 and a motor unit 3 are mixed and drive the vehicle. Electric power is supplied to the motor unit 3 through an inverter unit 4 from a battery 5 (a battery pack). In the embodiment, the engine 2, the motor unit 3 and the inverter unit 4 are mounted in an engine room 6 where front wheels and the like are positioned. In addition, the battery 5 is mounted in a rear part 7 of the vehicle where rear wheels and the like are positioned. Alternatively, the battery 5 may be mounted in an interior of the vehicle that is at rear side of the engine room 6.

The motor unit 3 and the inverter unit 4 are connected by a known high voltage wire harness 8. The battery 5 and the inverter unit 4 are connected by a wire harness 9 according to the embodiment. The wire harness 9 is prepared for a high voltage. The wire harness 9 is configured such that an intermediate part 10 thereof is arranged at the ground side of a floor body 11 of the vehicle. The floor body 11 of the vehicle is a known body, a so-called panel member, and a through hole (reference numeral is omitted) is penetrated therethrough at a predetermined position.

The wire harness 9 and the battery 5 are connected through a junction block 12 that is provided at the battery 5. A rear end 13 of the wire harness 9 is connected to the junction block 12 with a connector. A side of the rear end 13 of the wire harness 9 is arranged on or above the floor that is the interior side of the vehicle. A side of a front end 14 of the wire harness 9 is also arranged on or above the floor. The side of the front end 14 of the wire harness 9 is connected to the inverter unit 4 with a connector.

Here, supplementary explanation of the embodiment will be given. The motor unit 3 includes a motor and a generator. In addition, the inverter unit 4 includes an inverter and a converter. The motor unit 3 is formed as a motor assembly including a shield casing. The inverter unit 4 is also formed as an inverter assembly including a shield casing. The battery 5 is a Ni—MH base battery or a Li-ion base battery, and it is modulated. In addition, for example, an electricity storage device such as a capacitor may be used. The battery 5 is not specifically limited as long as it may be used in the hybrid motor vehicle 1 or the electric vehicle.

The wire harness 9 is configured such that the intermediate part 10 thereof is arranged substantially in parallel along the floor body 11 of the vehicle. The wire harness 9 is configured such that the intermediate part 10 thereof may be arranged so as to keep a distance from the ground and then as described below, the structure of the intermediate part 10 may be a structure of FIGS. 3A and 3B. The wire harness 9 is configured in a low height structure by keeping a distance from the ground.

First, the configuration and the structure of the wire harness 9 will be described. The wire harness 9 includes a conductive path assembly 15 and an outer member 16 that is provided outside the conductive path assembly 15. The conductive path assembly 15 includes two high voltage cables 17 and an electromagnetic shield member 18 that integrally shields the two high voltage cables 17. Each of the high voltage cable 17 is a conductive path including a conductor and an insulator (coating), and is formed so as to have a required length for electrical connection. The conductor is made of copper, copper alloy, aluminum or aluminum alloy. Regarding the conductor, a conductor structure that is formed by twisting element wires, or a conductor structure of a rod shape of which a cross-section is a rectangular shape or a round shape (for example, a conductor structure is a rectangular single core or a round single core, and in this case, the wire itself is also the round rod shape) may be used. The high voltage cable 17 has a configuration of a non-shielding electric wire. A connector 19 is provided at an end of the high voltage cable 17.

Although the high voltage cable 17 is used in the embodiment, the invention is not limited to the embodiment. In other words, a wire including an insulator provided on a known bus bar may be used.

The electromagnetic shield member 18 is a member for electromagnetic shielding (a member for a countermeasure against electromagnetic waves) covering two high voltage cables 17. The electromagnetic shield member 18 is formed in a tubular shape with the shield member including a conductive metal sheet, or a single body of a metal foil or the like. The electromagnetic shield member 18 has substantially the same length as the entire length of two high voltage cables 17. The electromagnetic shield member 18 is connected directly to the shield casing or the like of the inverter unit 4 or indirectly through the connector 19.

Although the electromagnetic shield member 18 includes the metal foil in the embodiment, the invention is not limited to the embodiment. In other words, if the countermeasure against electromagnetic waves is possible, for example, a braid having a number of extremely fine strands may be used. The braid is formed in a tubular shape having conductivity.

As described above, the electromagnetic shield member 18 is provided because the high voltage cable 17 is a non-shielding electric wire. In a case where the high voltage cable 17 is a known shield electric wire, the invention is not limited to the embodiment. That is, in this case, the electromagnetic shield member 18 may not be provided.

The outer member 16 includes a plurality of leading outer members 20 (20a, 20b, 20c. . . ) and a plurality of photo-crosslinkable fixing members 21 (21a, 21b. . . , or the water-crosslinkable fixing member) for later attachment that bonds the adjacent leading outer members 20.

The leading outer member 20 has a tubular shape and is formed so as to firstly pass along the conductive path assembly 15. In other words, the conductive path assembly 15 includes the high voltage cables 17 and the electromagnetic shield member 18 as the conductive path so that the leading outer member 20 firstly passes along them.

After the leading outer member 20 firstly passes along the conductive path assembly 15, the adjacent leading outer members 20 allows bending of the conductive path assembly 15 at a portion of arrow C between the adjacent leading outer members 20. The leading outer member 20 may be adjusted in a length dimension so as to allow the bending at a desired position.

The leading outer member 20 may be a shape so as only to firstly pass along the conductive path assembly 15. Thus, the leading outer member 20 may be a slightly bent tube. In other words, the invention is not limited to the leading outer member 20 having a straight tube and it may be the leading outer member 20 having a bending tubular shape.

The leading outer member 20 may be formed by any one of metal and resin. In the embodiment, the leading outer member 20 is formed by extrusion molding of the resin material. In addition, the reason that the leading outer member 20 is formed by resin is because there is no need for the process of the corrosion-protection or painting that is required in a case of using metal as well as the leading outer member 20 may be easily formed in a desired length when the extrusion molding is performed. In addition, the reason is that a predetermined coloring that indicates a high voltage is easily performed by coloring the resin material when molded. Besides the above description, a corrugated tube or the like may be exemplified as the leading outer member 20.

The photocrosslinkable fixing member 21 (or the watercrosslinkable fixing member) is a member that becomes finally a tube and bonds the above-described adjacent leading outer members 20 successively. The photocrosslinkable fixing member 21 (or the watercrosslinkable fixing member) is formed in a shape such as the straight tubular shape or the bending tubular shape depending on the arrangement route of the wire harness 9. When the photocrosslinkable fixing member 21 (or the watercrosslinkable fixing member) successively bonds the adjacent leading outer members 20 and is hardened or cross-linked (described below), the outer member 16 is considered as a successive tube. The photocrosslinkable fixing member 21 (or the watercrosslinkable fixing member) is arranged at a predetermined portion for example, shown in arrow A or B in FIG. 1A. The photocrosslinkable fixing member 21 (or the watercrosslinkable fixing member) may constitute a bending part 22 in the wire harness 9.

In FIGS. 1A to 2C, the photocrosslinkable fixing member 21 (or the watercrosslinkable fixing member) may be formed in a desired shape when it is hardened or cross-linked. In other words, when it is hardened or cross-linked, it becomes the outer member for later attachment. The photocrosslinkable fixing members 21 (or the watercrosslinkable fixing members) include a portion that is hardened or cross-linked by light or fluid and a base where the portion is formed integrally.

First, as a case of the hardening by light, the photocrosslinkable fixing members 21 includes a hardening portion having a photo irradiation surface and a base. The photocrosslinkable fixing member 21 is a member that is hardened by a visible light 30 or a dedicated illumination or the like. The hardening portion is constituted of photocrosslinkable resin composition and is held by dipping or the like with respect to the base. It is desirable that the photocrosslinkable fixing member 21 be a member where the hardening time thereof may be adjustable to instant hardening or slow hardening. The photocrosslinkable fixing member 21 is effective in a working environment where it is preferable not to have liquid (fluid is not an issue in the actual usage environment).

Next, as a case of the hardening by fluid, the watercrosslinkable fixing member includes a hardening portion having a water absorbing surface and a base. The watercrosslinkable fixing member is hardened by ejection or dripping of fluid 31 or dipping or the like in the liquid. The hardening portion is constituted of a watercrosslinkable resin composition and it is held by dipping or the like with respect to the base. As the base, glass wool, glass fiber cloth, polyester cloth, non-woven cloth or the like may be exemplified (may apply not only to the watercrosslinkable fixing member but also to the photocrosslinkable fixing member 21, in addition, glass fiber cloth and polyester cloth are suitable for the dipping of knit weaving and has an advantage in that the dipping is performed evenly without unevenness). In addition, as the hardening portion, a watercrosslinkable urethane resin or the like is exemplified. It is desirable that the watercrosslinkable fixing member be capable of adjusting the hardening time similar to the photocrosslinkable fixing member 21.

As described above, the photocrosslinkable fixing members 21 (or the watercrosslinkable fixing members) may bond the adjacent leading outer members 20 by winding or rolling. In other words, when it is a tape (narrow) shape, as shown in FIG. 2A, it may be bonded in a repetitive winding with the faculties of a tape winding. In addition, when it is a sheet (wide) shape, as shown in FIG. 2B, it may be bonded in a rolling. In FIGS. 2A and 2B, the photocrosslinkable fixing members 21 (or the watercrosslinkable fixing members) may be closely contacted with a portion of the conductive path assembly 15 in accordance with the winding or rolling (this is an example, and it may be not closely contacted).

By the formation of the photocrosslinkable fixing member 21 (or the watercrosslinkable fixing member) in a desired thickness in advance or the repetitive winding or rolling until reaching a desired thickness, the strength of the photocrosslinkable fixing member 21 after hardened may be secured. In addition, the shape holding state may be maintained by the security of the strength. Furthermore, there may be a portion that is strong against for example, stone bounce or the like due to the security of the strength.

A supply unit 32 that supplies the visible light 30, the dedicated illumination or fluid 31 (see FIG. 2C) to harden the photocrosslinkable fixing member 21 (or the watercrosslinkable fixing member) is arranged at the manufacturing site in tune with a position that successively attaches the photocrosslinkable fixing member 21 (or the watercrosslinkable fixing member). At the manufacturing site, in order to harden the photocrosslinkable fixing member 21 (or the watercrosslinkable fixing member) to a desired shape, the working property becomes good by using a jig or a molding.

Next, the manufacture of the wire harness 9 will be described based on the above-described configuration and the structure.

In FIGS. 1A to 2C, a required number of the leading outer members 20 having a desired entire length is prepared and after that, each of the leading outer members 20 passes along the conductive path assembly 15. Thus, when the connector 19 is provided at the end of the high voltage cable 17 that configures the conductive path assembly 15, the manufacture of the wire harness 9 is completed before transportation. After the leading outer member 20 firstly passes, the adjacent leading outer members 20 allow the bending of the conductive path assembly 15 at the portion of the arrow C between the leading outer members 20 so that the wire harness 9 that is manufactured as described above may be set in a state of easily being transported, for example, it may be wound.

The wire harness 9 is accommodated in a box (not shown) and transported to for example, an assembly factory of a vehicle manufacturer, and after that, the wire harness 9 is taken out from the box and is set in a state of easily being handled at the manufacturing site. Thus, if the adjacent leading outer members 20 are bonded using the photocrosslinkable fixing member 21 (or the watercrosslinkable fixing member), and also the portion where the photocrosslinkable fixing member 21 (or the watercrosslinkable fixing member) is provided is formed in a desired shape; and then the visible light 30, the dedicated illumination or fluid 31 is supplied, the photocrosslinkable fixing member 21 (or the watercrosslinkable fixing member) is hardened or cross-linked. Thus, the outer member 16 is formed as the successive tube so that the manufacturing of the wire harness 9 is completed. After that, when the wire harness 9 is assembled and fixed at the floor body 11 of the vehicle or the like, and when the electrical connection or the like is performed, the arrangement is completed.

In addition, before the transportation, the photocrosslinkable fixing members 21 (or the watercrosslinkable fixing members) may be wound so that the adjacent leading outer members 20 are bonded. This is because the photocrosslinkable fixing members 21 (or the watercrosslinkable fixing members) may allow the bending at the portion only if it is before the hardening.

In the above-described embodiment, although the outer member 16 is formed as the tubular shape, as shown in FIGS. 3A and 3B, it may be formed as a rectangular shape in cross-section (the rectangular shape in cross-section such as long circle, oval, oblong or the like). In FIG. 3A, an outer member 16' includes a plurality of leading outer members 20' (20a', 20b' . . . ) having a rectangular shape in cross-section and a plurality of photocrosslinkable fixing members 21' (21a' . . . , or a plurality of watercrosslinkable fixing members) for later attachment that successively bonds the adjacent leading outer members 20'. The conductive path assembly 15' that is protected by the outer member 16' includes two high voltage cables 17 and two low voltage cables 23, and an electromagnetic shield member 18' that integrally shields the high voltage cables 17 and the low voltage cables 23. As shown in FIG. 3B, each of the photocrosslinkable fixing members 21' (or the watercrosslinkable fixing members) is formed so as to have the tubular shape and property of flexibility at least in a radial direction. The photocrosslinkable fixing members 21' (or the watercrosslinkable fixing members) are widened in the radial direction and passed during the widening state so that the attachment relating to the bonding may be performed. A reference numeral 22' is a bending part.

In the above-described embodiment, although the wire harness 9 is formed without a branch portion, the branch portion may be formed to be drawn out at a desired position. Thus, the photocrosslinkable fixing member 21 (or the watercrosslinkable fixing members) is provided so as to cover an exposed portion of the branch portion when the branch portion is taken out and it may be hardened.

Hereinabove, as described with reference to FIGS. 1A to 3B, according to the embodiment, there is an advantage in that since the outer member 16 includes the leading outer member 20 having the tubular shape, the watercrosslinkable fixing member or the photocrosslinkable fixing member 21 that is hardened or cross-linked by fluid or light is used, and the conductive path assembly 15 may be bent between the adjacent leading outer members 20 before the watercrosslinkable fixing member or the photocrosslinkable fixing member 21 is provided, secure of large space is not required during the transportation of the wire harness 9, as a result, there is an advantage in that space saving and low cost may be achieved in the transportation.

In addition, according to the embodiment, there is an advantage in that since the photocrosslinkable fixing member 21 (or the watercrosslinkable fixing member) is hardened and then the wire harness 9 may be held in a desired shape, the shape may be held without using the protector. Furthermore, according to the embodiment, there is an advantage in that since the outer member 16 is configured of the leading outer member 20 and the photocrosslinkable fixing member 21 (or the watercrosslinkable fixing member), the conductive path assembly 15 is protected without complicating the structure thereof as much as the protector and then the cost reduction is promoted.

Furthermore, according to the embodiment, there is an advantage in that since the outer member 16 is configured of the leading outer member 20 and the photocrosslinkable fixing member 21 (or the watercrosslinkable fixing member), the wire harness 9 having high versatility compared to the usage of the protector is provided.

The invention may be variously modified without departing from the gist of the invention.

The present application is based on Japanese Patent Application No. 2010-292021 filed on Dec. 28, 2010, the contents of which are incorporated herein by reference.

REFERENCE SIGNS LIST

1: hybrid motor vehicle
2: engine
3: motor unit
4: inverter unit
5: battery
6: engine room
7: rear part of vehicle
8: high voltage wire harness
9: wire harness
10: intermediate part
11: floor body of vehicle
12: junction block
13: rear end
14: front end
15: conductive path assembly
16: outer member
17: high voltage cable (conductive path)
18: electromagnetic shield member
19: connector
20: leading outer member
21: photocrosslinkable fixing member (or watercrosslinkable fixing member)
22: bending part
23: low voltage cable (conductive path)
30: visible light
31: fluid
32: supply unit

The invention claimed is:

1. A wire harness, comprising:
one or more conductive paths; and
an outer member that includes a plurality of leading outer members, each having a tubular shape that circumscribes the one or more conductive paths, the leading outer members being spaced from each other along a longitudinal direction of the one or more conductive paths; and a watercrosslinkable fixing member or a photocrosslinkable fixing member that contacts and bonds adjacent end portions of the plurality of leading outer members.

2. The wire harness according to claim 1, wherein the watercrosslinkable fixing member or the photocrosslinkable fixing member is formed as a bending part of one of the outer members.

3. The wire harness according to claim 1, further comprising:
an electromagnetic shield member that covers almost entire length of the one or more conductive paths, wherein
the watercrosslinkable fixing member or the photocrosslinkable fixing member is contacted with the electromagnetic shield member.

4. A method of manufacturing a wire harness, comprising:
a first process of passing a plurality of leading outer members, each having a tubular shape along one or more conductive paths such that the leading outer members are spaced from each other in a longitudinal direction of the one or more conductive paths and circumscribe the one or more conductive paths; and
a second process of bonding adjacent end portions of the plurality of leading outer members with a watercrosslinkable fixing member or a photocrosslinkable fixing member.

5. The method according to claim 4, wherein
the second process is performed during an arrangement operation of the wire harness after the wire harness is transported.

* * * * *